United States Patent
Okada et al.

[11] Patent Number: 6,038,084
[45] Date of Patent: Mar. 14, 2000

[54] ZOOM LENS SYSTEM

[75] Inventors: Takashi Okada, Nishinomiya; Tetsuya Arimoto, Sakai; Mamoru Terada, Sakai; Kenji Konno, Sakai; Tetsuo Kohno, Toyonaka; Kazuhiko Ishimaru, Kaizuka, all of Japan

[73] Assignee: Minolta Co., Ltd., Osaka, Japan

[21] Appl. No.: 09/170,831

[22] Filed: Oct. 13, 1998

[30] Foreign Application Priority Data

Oct. 17, 1997 [JP] Japan ................................... 9-285171

[51] Int. Cl.[7] .................................................. G02B 15/14
[52] U.S. Cl. ............................................................ 359/689
[58] Field of Search .................................. 359/680–682, 359/689, 749–753, 784

[56] References Cited

U.S. PATENT DOCUMENTS

| | | | |
|---|---|---|---|
| 4,687,302 | 8/1987 | Ikemori et al. | 350/427 |
| 4,824,223 | 4/1989 | Docter et al. | 350/427 |
| 5,009,491 | 4/1991 | Hata | 350/427 |
| 5,132,848 | 7/1992 | Nishio et al. | 359/686 |
| 5,455,714 | 10/1995 | Kohno | 359/689 |
| 5,539,582 | 7/1996 | Kohno et al. | 359/689 |

*Primary Examiner*—Scott J. Sugarman
*Assistant Examiner*—David N. Spector
*Attorney, Agent, or Firm*—Sidley & Austin

[57] ABSTRACT

A zoom lens system has at least three lens units of, from the most object side, a first lens unit having a negative optical power, a second lens unit having a positive optical power and a third lens unit, wherein the distances between the lens units are varied by moving all of the lens units during zooming. The zoom lens system satisfies the predetermined mathematical condition.

24 Claims, 8 Drawing Sheets

SPHERICAL ABERRATION
SINE CONDITION

ASTIGMATISM

DISTORTION %

SPHERICAL ABERRATION
SINE CONDITION

ASTIGMATISM

DISTORTION %

SPHERICAL ABERRATION
SINE CONDITION

ASTIGMATISM

DISTORTION %

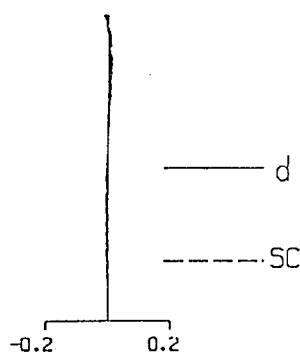
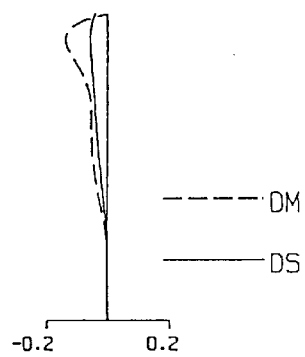
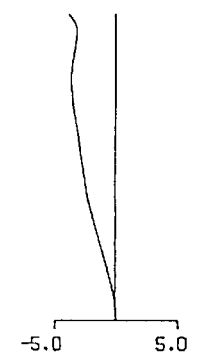
SPHERICAL ABERRATION
SINE CONDITION
Fig.6a
ASTIGMATISM
Fig.6b
DISTORTION %
Fig.6c
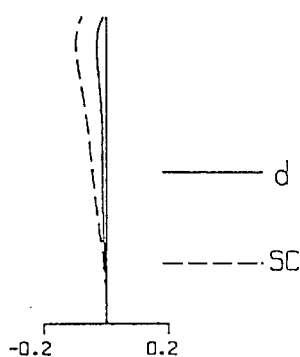
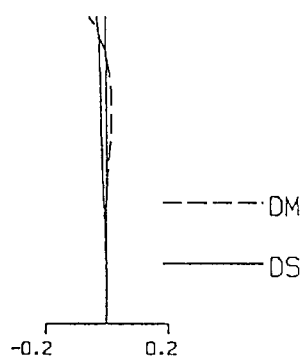
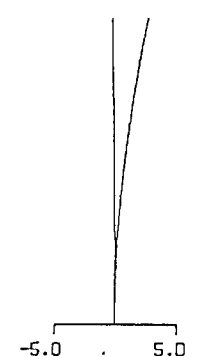
SPHERICAL ABERRATION
SINE CONDITION
Fig.6d
ASTIGMATISM
Fig.6e
DISTORTION %
Fig.6f
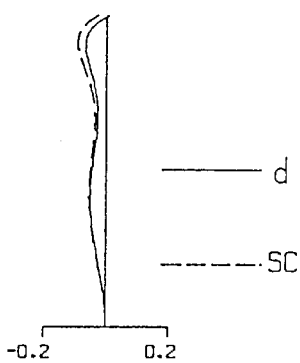
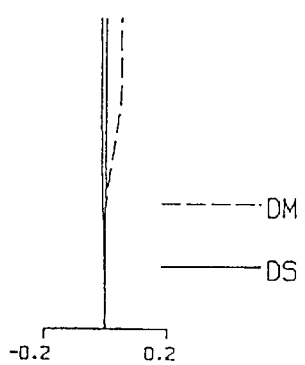
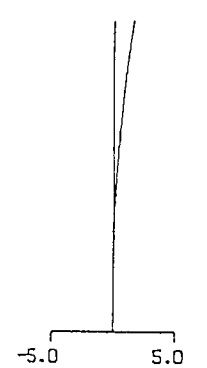
SPHERICAL ABERRATION
SINE CONDITION
Fig.6g
ASTIGMATISM
Fig.6h
DISTORTION %
Fig.6i

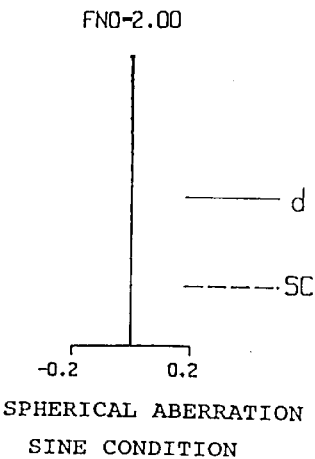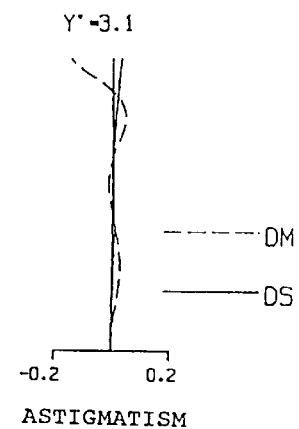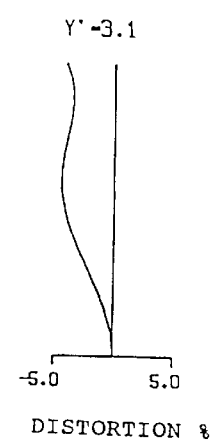
Fig.7a  Fig.7b  Fig.7c
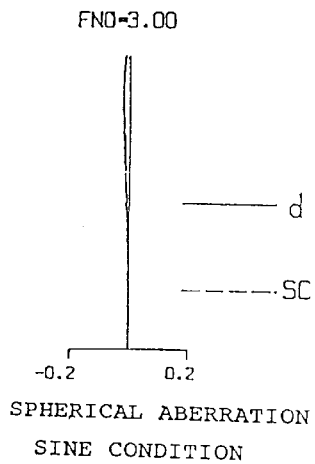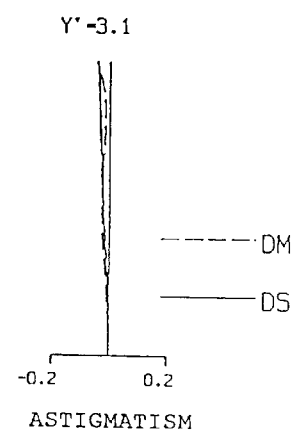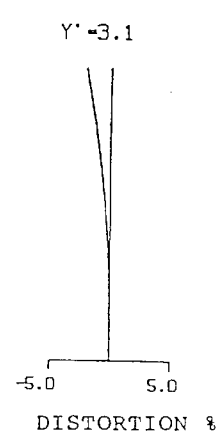
Fig.7d  Fig.7e  Fig.7f
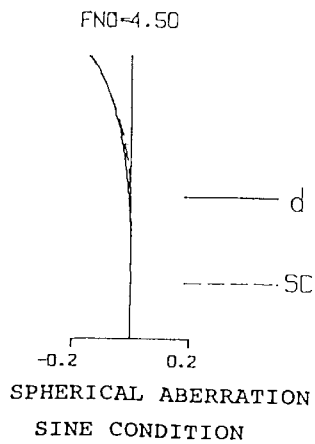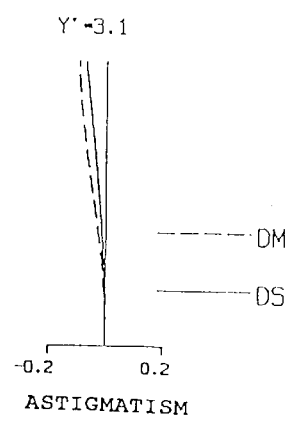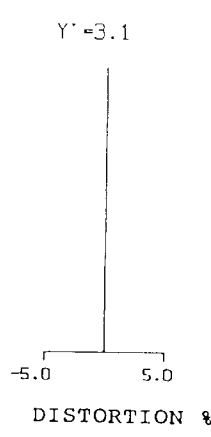
Fig.7g  Fig.7h  Fig.7i

SPHERICAL ABERRATION
SINE CONDITION

ASTIGMATISM

DISTORTION %

SPHERICAL ABERRATION
SINE CONDITION

ASTIGMATISM

DISTORTION %

SPHERICAL ABERRATION
SINE CONDITION

ASTIGMATISM

DISTORTION %

ZOOM LENS SYSTEM

This application is based on the application No. 9-285171 filed in Japan, the contents of which is hereby incorporated by reference.

BACKGROUND OF THE INVENTION

1. Field of the Invention

The present invention relates to a zoom lens system used for a small-size taking optical system, and more specifically, to a compact and high-magnification zoom lens system being suitable for a taking optical system for a digital input/output apparatus such as a digital still camera and a digital video camera.

2. Description of the Related Art

In recent years, with the spread of personal computers, digital still cameras and digital video cameras (hereinafter, referred to as digital cameras) capable of easily capturing image information into digital apparatuses have been spreading among personal users. It is expected that such digital cameras will increasingly spread as image information inputting apparatuses.

Generally, the image quality of a digital camera depends on the number of pixels of the solid-state image sensing device such as a CCD (charge coupled device). At present, the solid-state image sensing device mainly used for consumer digital cameras is a so-called VGA-class solid-state image sensing device having approximately 330,000 pixels. However, the image quality of the VGA-class camera largely pales in comparison with the image quality of conventional cameras using silver halide film. For this reason, consumer digital cameras have recently been desired to have high image quality exceeding one million pixels, and the taking optical systems of these digital cameras have also been desired to satisfy high image quality.

Since these consumer digital cameras have also been desired to perform zooming, particularly, optical zooming in which image quality degradation is small, digital camera zoom lens systems having high magnification and satisfying high image quality have been required in recent years.

However, conventional digital camera zoom lens systems satisfying the high image quality exceeding one million pixels are mostly interchangeable lens systems for single-lens reflex cameras that are diverted to digital camera taking optical systems, and zoom lens systems for large-size digital cameras for business use. These zoom lens systems are unsuitable for consumer digital cameras because they are large in size and high in cost.

On the other hand, it is considered to divert, to digital camera taking optical systems, taking optical systems for silver halide film lens shutter cameras that have been remarkably reduced in size and increased in magnification in recent years.

However, when a taking optical system for a lens shutter camera is used in a digital camera, it is impossible to sufficiently satisfy the light condensing performance of a micro lens provided on the front surface of the solid-state image sensing device of the digital camera, so the image brightness extremely differs between the central portion and the peripheral portion of the image. This problem is caused because the off-axial luminous flux exiting from the lens shutter camera taking optical system is obliquely incident on the image plane since the exit pupil of the taking optical system is situated near the image plane. If the distance between the image plane and the exit pupil position of the conventional lens shutter camera taking optical system is increased to solve this problem, the taking optical system will inevitably increase in overall size.

SUMMARY OF THE INVENTION

An object of the present invention is to provide an improved zoom lens system.

Another object of the present invention is to provide a completely novel zoom lens system being compact, having high magnification and satisfying high image quality.

The above-mentioned objects are achieved by a zoom lens system comprising at least three lens units of, from the most object side, a first lens unit having a negative optical power, a second lens unit having a positive optical power and a third lens unit, wherein the distances between the lens units are varied by moving all of the lens units during zooming, and the following conditions are satisfied:

$$5.0 < \frac{fT}{fW} < 12.0$$

$$14.0 < \frac{TW}{fW}$$

where fT is the overall focal length of the zoom lens system at the longest focal length condition, fW is the overall focal length of the zoom lens system at the shortest focal length condition, and TW is the overall length of the zoom lens system at the shortest focal length condition.

The invention itself, together with further objects and attendant advantages, will be understood by reference to the following detailed description taken in conjunction with the accompanying drawings.

BRIEF DESCRIPTION OF THE DRAWINGS

FIGS. 6(a) to 6(i) are graphic representations of aberrations of the zoom lens system of the second embodiment;

FIGS. 7(a) to 7(i) are graphic representations of aberrations of the zoom lens system of the third embodiment.

In the following description, like parts are designated by like reference numbers throughout the several drawings.

DETAILED DESCRIPTION OF THE PREFERRED EMBODIMENTS

Hereinafter, preferred embodiments of the present invention will be described with reference to the drawings.

In this specification, "optical power" represents a quantity defined by the reciprocal number of the focal length and includes not only optical power by deflection at a surface of media with refractive indices having different deflecting actions but also optical power by deflection by diffraction and deflection by the distribution of refractive index in the medium. "Refractive power" represents, of the above-described optical power, an optical power due to deflection caused at an interface between media having different refractive indices.

Figure 1:
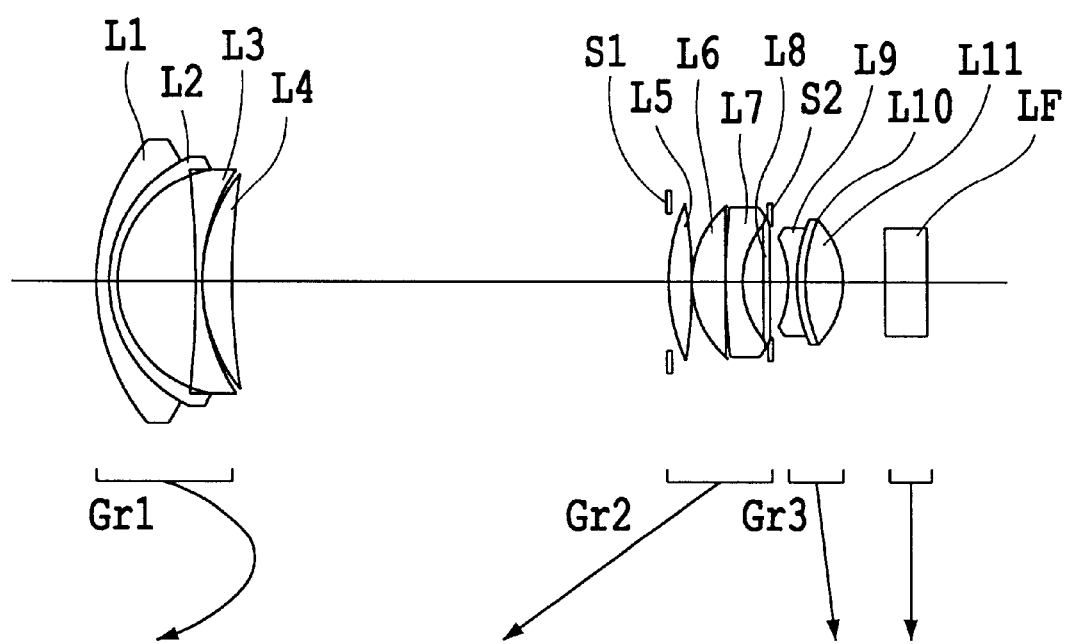
FIG. 1 shows the lens construction of a zoom lens system of a first embodiment.

FIG. 1 is a cross-sectional view showing the lens construction of a zoom lens system of a first embodiment. The zoom lens system of the first embodiment comprises from the object side a first lens unit Gr1 having a negative refractive power, a second lens unit Gr2 having a positive refractive power, a third lens unit Gr3 having a positive refractive power, and a low-pass filter LF. In the zoom lens system of the first embodiment, during zooming from the shortest focal length condition to the longest focal length condition, the first lens unit Gr1 is first moved toward the image side and then moved toward the object side, the second lens unit Gr2 is monotonously moved toward the object side and the third lens unit Gr3 is monotonously moved toward the image side, thereby varying the magnification. The arrows in the figure show the movements of the lens units, the diaphragm and the low-pass filter during zooming from the shortest focal length condition to the longest focal length condition.

In the zoom lens system of the first embodiment, the first lens unit Gr1 comprises from the object side the following four lens elements: a first lens element L1 being a negative meniscus lens element convex to the object side and whose object side surface is aspherical; a second lens element L2 being a positive meniscus lens element convex to the object side; a third lens element L3 being a bi-concave lens element whose image side surface is aspherical; and a fourth lens element L4 being a positive meniscus lens element convex to the object side.

The second lens unit Gr2 comprises from the object side the following four lens elements: a fifth lens element L5 being a bi-convex lens element whose object side surface is aspherical; a sixth lens element L6 being a positive meniscus lens element convex to the object side; a seventh lens element L7 being a negative meniscus lens element convex to the object side; and an eighth lens element L8 being a bi-convex lens element.

The third lens unit Gr3 comprises from the object side the following three lens elements: a ninth lens element L9 being bi-concave lens element whose object side surface is aspherical; a tenth lens element L10 being a positive meniscus lens element convex to the object side; and an eleventh lens element L11 being a bi-convex lens element whose image side surface is aspherical.

A diaphragm S1 is disposed on the object side of the second lens unit Gr2. A light intercepting plate S2 is disposed on the image side of the second lens unit Gr2. During zooming, the diaphragm S1 and the light intercepting plate S2 are moved integrally with the second lens unit Gr2.

Figure 2:
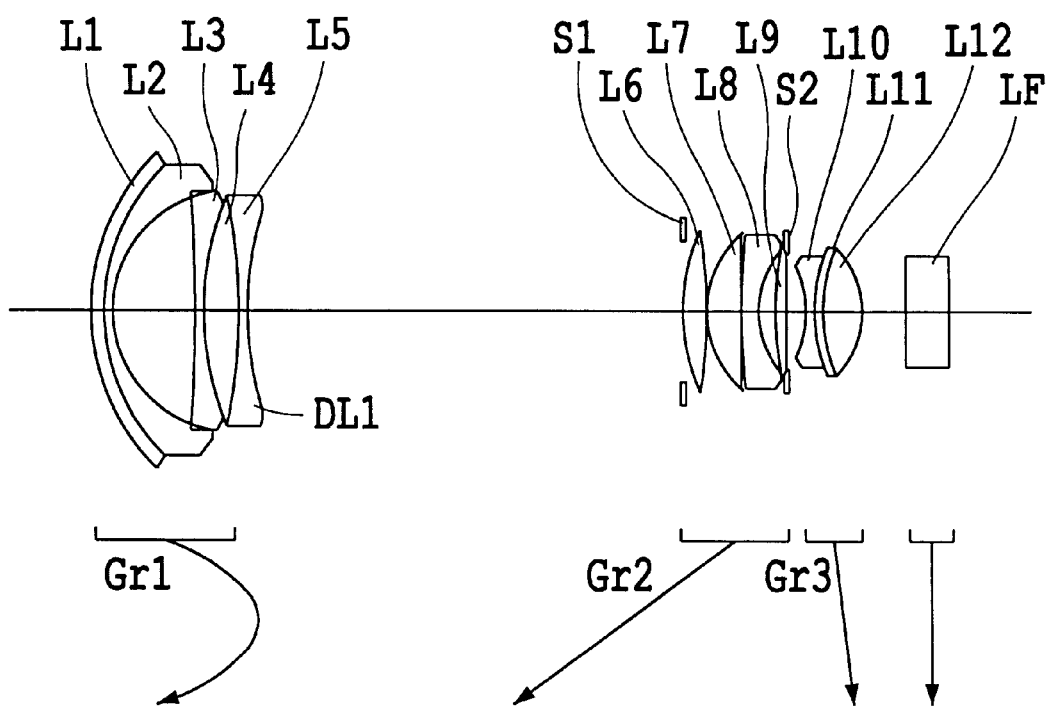
FIG. 2 shows the lens construction of a zoom lens system of a second embodiment.

FIG. 2 is a cross-sectional view showing the lens construction of a zoom lens system of a second embodiment. The zoom lens system of the second embodiment comprises from the object side a first lens unit Gr1 having a negative refractive power, a second lens unit Gr2 having a positive refractive power, a third lens unit Gr3 having a positive refractive power, and a low-pass filter LF. In the zoom lens system of the second embodiment, during zooming from the shortest focal length condition to the longest focal length condition, the first lens unit Gr1 is first moved toward the image side and then moved toward the object side, the second lens unit Gr2 is monotonously moved toward the object side and the third lens unit Gr3 is monotonously moved toward the image side, thereby varying the magnification.

In the zoom lens system of the second embodiment, the first lens unit Gr1 comprises from the object side the following four lens elements: a first lens element L1 being a negative meniscus lens element convex to the object side and whose object side surface is aspherical; a second lens element L2 being a positive meniscus lens element convex to the object side; a third lens element L3 being a bi-concave lens element whose object side surface and image side surface are both aspherical; and a first doublet lens element DL1 of a fourth lens element L4 being a bi-convex lens element and a fifth lens element L5 being a bi-concave lens element and whose image side surface is aspherical.

The second lens unit Gr2 comprises from the object side the following four lens elements: a sixth lens element L6 being a bi-convex lens element whose object side surface is aspherical; a seventh lens element L7 being a positive meniscus lens element convex to the object side; an eighth lens element L8 being a negative meniscus lens element convex to the object side; and a ninth lens element L9 being a positive meniscus lens element whose image side surface is aspherical.

The third lens unit Gr3 comprises from the object side the following three lens elements: a tenth lens element L10 being a bi-concave lens element whose object side surface is aspherical; an eleventh lens element L11 being a positive meniscus lens element convex to the object side; and a twelfth lens element L12 being a bi-convex lens element whose image side surface is aspherical.

A diaphragm S1 is disposed on the object side of the second lens unit Gr2. A light intercepting plate S2 is disposed on the image side of the second lens unit Gr2. During zooming, the diaphragm S1 and the light intercepting plate S2 are moved integrally with the second lens unit Gr2.

Figure 3:
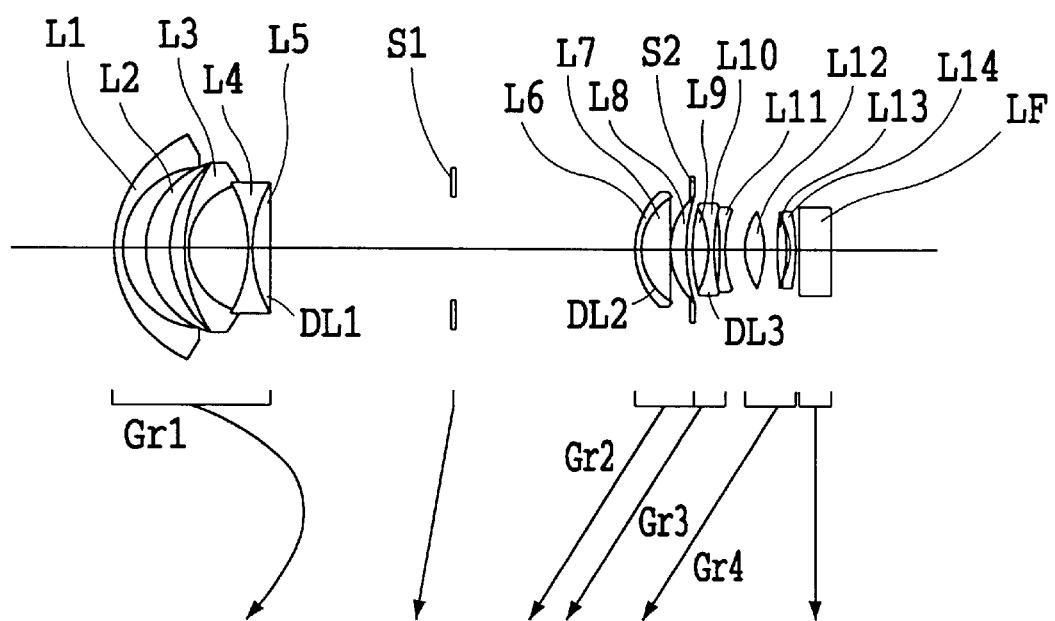
FIG. 3 shows the lens construction of a zoom lens system of a third embodiment.

FIG. 3 is a cross-sectional view showing the lens construction of a zoom lens system of a third embodiment. The zoom lens system of the third embodiment comprises from the object side a first lens unit Gr1 having a negative refractive power, a second lens unit Gr2 having a positive refractive power, a third lens unit Gr3 having a negative refractive power, a fourth lens unit Gr4 having a positive refractive power, and a low-pass filter LF. In the zoom lens system of the third embodiment, during zooming from the shortest focal length condition to the longest focal length condition, the first lens unit Gr1 is first moved toward the image side and then moved toward the object side, and the second lens unit Gr2, the third lens unit Gr3 and the fourth lens unit Gr4 are monotonously moved toward the image side at different speeds, thereby varying the magnification.

In the zoom lens system of the third embodiment, the first lens unit Gr1 comprises from the object side the following four lens elements: a first lens element L1 being a negative meniscus lens element convex to the object side; a second lens element L2 being a positive meniscus lens element convex to the object side and whose object side surface is aspherical; a third lens element L3 being a negative meniscus lens element convex to the object side and whose object side surface is aspherical; and a first doublet lens element DL1 of a fourth lens element L4 being a bi-convex lens element and a fifth lens element L5 being a bi-concave lens element.

The second lens unit Gr2 comprises from the object side the following two lens elements: a second doublet lens element DL2 of a sixth lens element L6 being a negative meniscus lens element convex to the object side and a seventh lens element L7 being a bi-convex lens element; and an eighth lens element L8 being a positive meniscus lens element convex to the object side.

The third lens unit Gr3 comprises from the object side the following two lens elements: a third doublet lens element DL3 of a ninth lens element L9 being a bi-convex lens element and a tenth lens element L10 being a bi-concave lens element; and an eleventh lens element L11 being a bi-concave lens element.

The fourth lens unit Gr4 comprises from the object side the following three lens elements: a twelfth lens element L12 being a bi-convex lens element whose object side surface is aspherical; a thirteenth lens element L13 being a bi-concave lens element; and a fourteenth lens element L14 being a negative meniscus lens element concave to the object side.

A diaphragm S1 is disposed between the first lens unit Gr1 and the second lens unit Gr2. A light intercepting plate S2 is disposed on the image side of the second lens unit Gr2. During zooming from the shortest focal length condition to the longest focal length condition, the diaphragm S1 is moved toward the object side at a speed different from the first lens unit Gr1 and the second lens unit Gr2, whereas the light intercepting plate S2 is moved integrally with the second lens unit Gr2.

Figure 4:
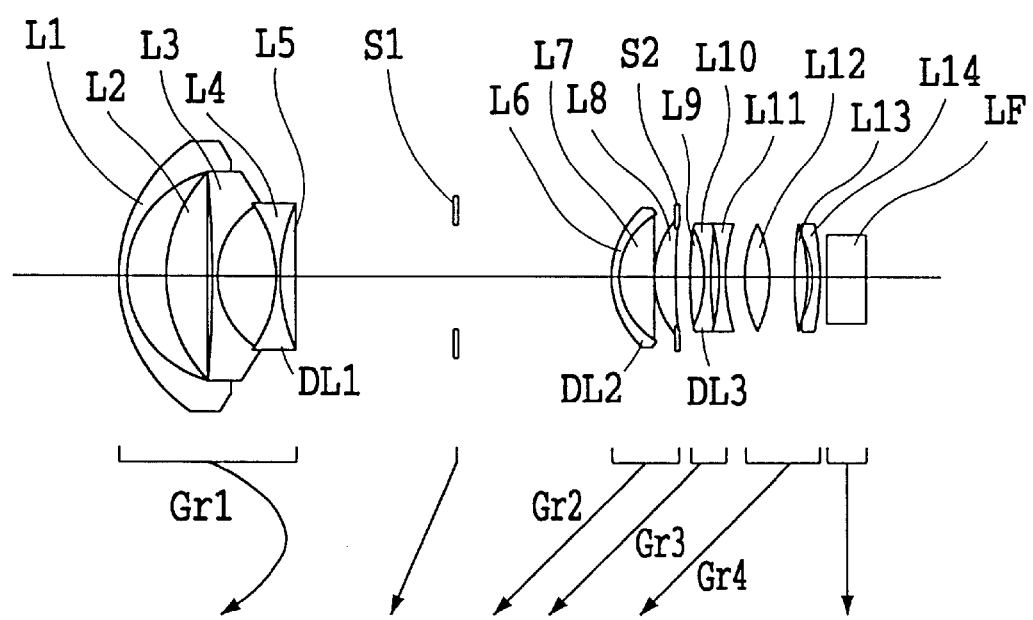
FIG. 4 shows the lens construction of a zoom lens system of a fourth embodiment.
Figure 5A:
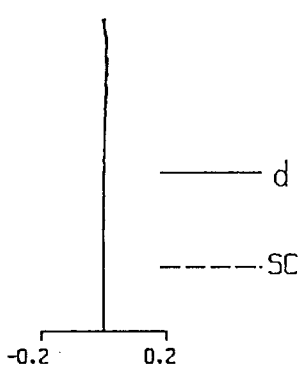
FIGS. 5(a) to 5(i) are graphic representations of aberrations of the zoom lens system of the first embodiment.
Figure 5B:
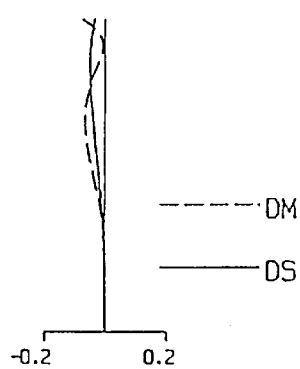
Figure 5C:
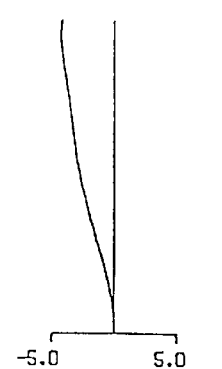
Figure 5D:
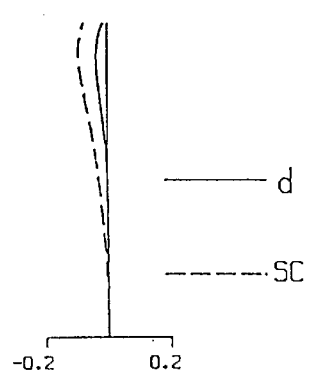
Figure 5E:
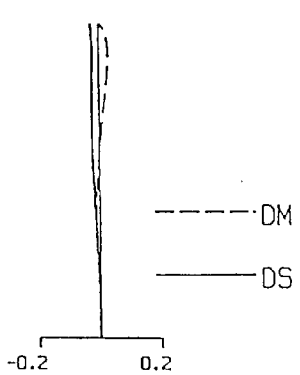
Figure 5F:
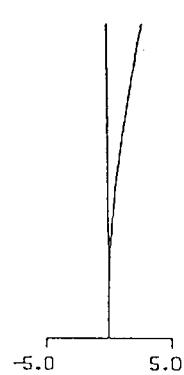
Figure 5G:
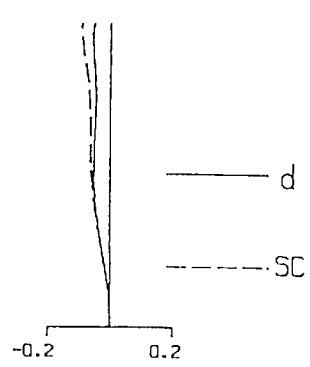
Figure 5H:
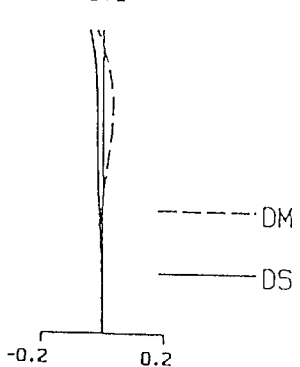
Figure 5I:
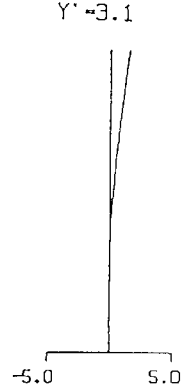
Figure 8A:
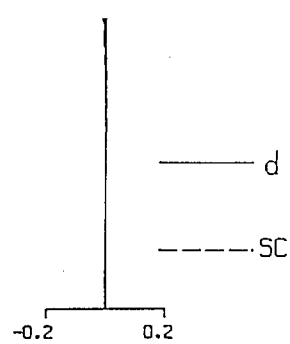
FIGS. 8(a) to 8(i) are graphic representations of aberrations of the zoom lens system of the fourth embodiment.
Figure 8B:
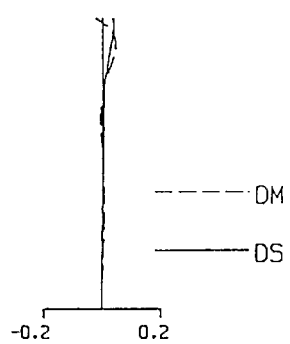
Figure 8C:
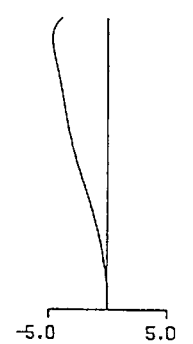
Figure 8D:
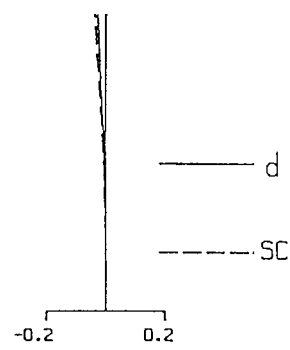
Figure 8E:
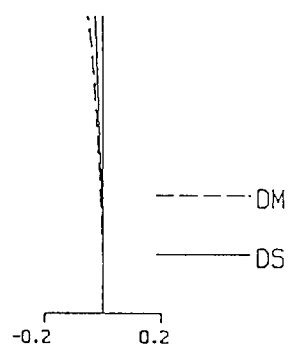
Figure 8F:
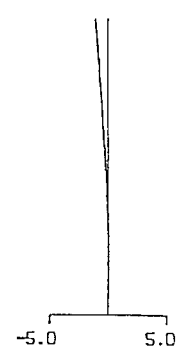
Figure 8G:
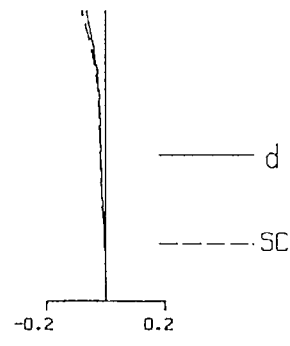
Figure 8H:
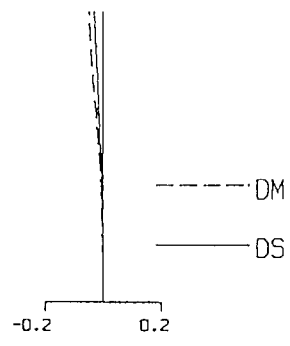
Figure 8I:
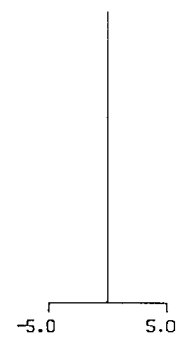

FIG. 4 is a cross-sectional view showing the lens construction of a zoom lens system of a fourth embodiment. The zoom lens system of the fourth embodiment comprises from the object side a first lens unit Gr1 having a negative refractive power, a second lens unit Gr2 having a positive refractive power, a third lens unit Gr3 having a negative refractive power, a fourth lens unit Gr4 having substantially no optical power, and a low-pass filter LF. In the zoom lens system of the fourth embodiment, during zooming from the shortest focal length condition to the longest focal length condition, the first lens unit Gr1 is first moved toward the image side and then moved toward the object side, and the second lens unit Gr2, the third lens unit Gr3 and the fourth lens unit Gr4 are monotonously moved toward the image side at different speeds, thereby varying the magnification.

In the zoom lens system of the fourth embodiment, the first lens unit Gr1 comprises from the object side the following four lens elements: a first lens element L1 being a negative meniscus lens element convex to the object side; a second lens element L2 being a positive meniscus lens element convex to the object side and whose object side surface is aspherical; a third lens element L3 being a bi-concave lens element whose object side surface is aspherical; and a first doublet lens element DL1 of a fourth lens element L4 being a bi-concave lens element and a fifth lens element being a bi-convex lens element.

The second lens unit Gr2 comprises from the object side the following two lens elements: a second doublet lens element DL2 of a sixth lens element L6 being a positive meniscus lens element convex to the object side and a seventh lens element L7 being a bi-convex lens element; and an eighth lens element L8 being a positive meniscus lens element convex to the object side.

The third lens unit Gr3 comprises from the object side the following two lens elements: a third doublet lens element DL3 of a ninth lens element L9 being a bi-convex lens element and a tenth lens element L10 being a bi-concave lens element; and an eleventh lens element L11 being a bi-concave lens element.

The fourth lens unit Gr4 comprises from the object side the following three lens elements: a twelfth lens element L12 being a bi-convex lens element whose object side surface is aspherical; a thirteenth lens element L13 being a bi-concave lens element; and a fourteenth lens element L14 being a negative meniscus lens element concave to the object side.

A diaphragm S1 is disposed between the first lens unit Gr1 and the second lens unit Gr2. A light intercepting plate S2 is disposed on the image side of the second lens unit Gr2. During zooming from the shortest focal length condition to the longest focal length condition, the diaphragm S1 is moved toward the object side at a speed different from the first lens unit Gr1 and the second lens unit Gr2, whereas the light intercepting plate S2 is moved integrally with the second lens unit Gr2.

Subsequently, conditions to be satisfied by the zoom lens systems of the embodiments will be described. While it is desirable for zoom lens systems having the constructions of the embodiments to satisfy the conditions described below, it is not essential for them to satisfy all the conditions at the same time. Satisfaction of one condition produces corresponding advantageous effects.

It is desirable that a zoom lens system comprising at least three lens units of, from the most object side, a first lens unit having a negative optical power, a second lens unit having a positive optical power and a third lens unit and in which the distances between the lens units are varied by moving all of the lens units during zooming satisfy the range defined by the following condition (1):

$$5.0 < \frac{fT}{fW} < 12.0 \qquad (1)$$

where
 $fT$ is the overall focal length of the zoom lens system at the longest focal length condition, and
 $fW$ is the overall focal length of the zoom lens system at the shortest focal length condition.

The condition (1) defines the zoom ratio. None of the conventional zoom lens systems comprising at least three lens units of, from the object side, a negative first lens unit, a positive second lens unit and a negative third lens unit achieves the satisfaction of the condition (1) as realized in the zoom lens systems of the embodiments.

In the zoom lens systems of the embodiments, a high magnification that cannot be realized by the conventional zoom lens systems is realized by effectively moving the lens units. When the zoom ratio is within the range of the condition (1), the overall size of the optical system is within a range that causes no problems in the zoom range even if any of the lens units is stationary during zooming like the conventional zoom lens systems. However, in a range where the zoom ratio as defined by the condition (1) is high, the size of the optical system increases.

$$14.0 < \frac{TW}{fW} \qquad (2)$$

where
 TW is the overall length of the zoom lens system at the shortest focal length condition, and
 $fW$ is the focal length of the zoom lens system at the shortest focal length condition.

The condition (2) defines the telephoto ratio of a zoom lens system at the shortest focal length condition and is a value representing compactness of an optical system. In the zoom lens systems of the embodiments, by effectively moving the lens units, the size is small compared with the conventional zoom lens systems although the angle of view at the shortest focal length condition is comparatively wide. Generally, in a wide-angle zoom lens system, although it is difficult to secure the lens back focal length, it is necessary that the exit pupil be situated away from the image plane in the case of an optical system for digital cameras because of characteristics of the micro lens provided in the solid-state image sensing device. However, when the exit pupil is situated away from the image plane in an optical system with a short focal length (in the extreme case, when the optical system is telecentric to the image side), it is impossible to design such an optical system unless the size of the optical system is increased. On the contrary, in the zoom lens systems of the embodiments, by effectively moving the lens units during zooming, the telephoto ratio is extremely low although the angle of view is wide.

It is desirable that a zoom lens system satisfying the conditions (1) and (2) have any of the following constructions: a three-unit construction comprising from the object side a first lens unit having a negative optical power, a second lens unit having a positive optical power and a third lens unit having a positive optical power (the first and the second embodiments); a four-unit construction comprising from the object side a first lens unit having a negative optical power, a second lens unit having a positive optical power, a third lens unit having a negative optical power and a fourth lens unit having a positive optical power (the third embodiment); and a four-unit construction comprising from the object side a first lens unit having a negative optical power, a second lens unit having a positive optical power, a third lens unit having a negative optical power and a fourth lens unit having substantially no optical power (the fourth embodiment).

Since the zoom lens systems of the embodiments have any of the above-described constructions, the number of lens units moved during zooming is small, so that the lens barrel structure can be simplified.

It is desirable that a zoom lens system comprising at least three lens units of, from the most object side, a first lens unit having a negative optical power, a second lens unit having a positive optical power and a third lens unit and in which the distances between the lens units are varied by moving all of the lens units during zooming satisfy the range defined by the following condition (3):

$$2.0 < \frac{|f1|}{fW} < 5.0 \quad (3)$$

where $f1$ represents the focal length of the first lens unit.

The condition (3) defines the focal length of the first lens unit. When the upper limit of the condition (3) is exceeded so that the focal length of the first lens unit is too long, the negative optical power disposed on the object side of the zoom lens system is too weak, so that it is difficult to secure the lens back focal length. As a result, it is impossible to satisfy a condition for an afocal system that is necessary for a zoom lens system using a solid-state image sensing device. Such an optical system is meaningless as an optical system. On the contrary, when the lower limit of the condition (3) is exceeded so that the absolute value of the focal length of the first lens unit is too low (that is, when the negative optical power of the first lens unit is too strong), although the afocal condition is easier to satisfy as an afocal system, aberration generated in the first lens unit, specifically, negative distortion on the shortest focal length side, is too great, so that it is impossible to correct distortion with the elements of the second and the succeeding lens units.

It is desirable that a zoom lens system comprising at least three lens units of, from the most object side, a first lens unit having a negative optical power, a second lens unit having a positive optical power and a third lens unit in which the distances between the lens units are varied by moving all of the lens units during zooming satisfy the range defined by the following condition (4):

$$2.0 < \frac{f2}{fW} < 4.5 \quad (4)$$

where $f2$ represents the focal length of the second lens unit.

The condition (4) defines the focal length of the second lens unit. When the lower limit of the condition (4) is exceeded so that the focal length of the second lens unit is too short, in order to compensate for the amount of magnification variation by the second lens unit, it is necessary to increase the movement amounts of the other lens units, so that the overall size of the zoom lens system increases. On the contrary, when the upper limit of the condition (4) is exceeded so that the focal length of the second lens unit is too short, this construction is advantageous because a necessary magnification variation amount can be ensured with a small movement amount of the second lens unit. However, it is difficult to correct aberrations in the entire lens system. Specifically, it is impossible to balance axial spherical aberration on the longer focal length side and on the shorter focal length side. That is, the amount of variation in spherical aberration increases on the longer focal length side and on the shorter focal length side, so that spherical aberration exceeds the permissible level on either of the focal length sides.

It is desirable that a zoom lens system comprising at least three lens units of, from the most object side, a first lens unit having a negative optical power, a second lens unit having a positive optical power and a third lens unit in which the distances between the lens units are varied by moving all of the lens units during zooming satisfy the range defined by the following condition (5):

$$11 < img*R < 17 \quad (5)$$

where img is the maximum image height, and

R is the effective aperture of the most image side surface.

The condition (5) is for appropriately maintaining the size of the zoom lens system, aberrations and a condition particular to digital cameras. In a solid-state image sensing device, a micro lens is typically provided on the front surface of each light receiving device in order to improve the light condensing performance. In order for the micro lens to sufficiently deliver the light condensing performance thereof, it is necessary that the light ray be made incident substantially vertically to the optical axis of the micro lens. To do so, it is necessary that the taking optical system be substantially telecentric to the image side. When the upper limit of the condition (5) is exceeded, the substantial telecentricity of the taking optical system is excessive, so that negative distortion on the shorter focal length side increases and the field tilt toward the under side increases. When the lower limit exceeded, it is difficult to satisfy the telecentricity and even if the telecentricity is satisfied, the back focus increases more than necessary, so that the size of the zoom lens system increases.

It is desirable that the lens units have on at least one surface thereof an aspherical surface satisfying the following condition (6):

$$-0.1 < \phi \cdot (N' - N) \cdot \frac{d}{dH}\{X(H) - X0(H)\} < 0 \tag{6}$$

where d/dH represents a differential symbol,

φ represents the optical power of the aspherical surface,

N' represents the refractive index of a medium on the image side of the aspherical surface, N represents the refractive index of a medium on the object side of the aspherical surface, H represents the height in the direction vertical to the optical axis, X(H) represents the amount of axial displacement at the height H (with the vertex as the reference), and X0(H) is the amount of displacement of a reference spherical surface at the height H (with the vertex as the reference).

Provision of an aspherical surface in the first lens unit is effective mainly in correction of distortion on the shorter focal length side and correction of spherical aberration on the longer focal length side. Particularly, by providing an aspherical surface near the object side in the first lens unit, mainly distortion on the shorter focal length side can be corrected. When the limits of the condition (6) are exceeded so that the aspherical surface provided on a positive surface decreases the optical power of the positive surface too much, distortion on the shorter focal length side is largely generated in the negative direction, so that it is impossible to sufficiently correct aberration with the other surfaces. On the contrary, when the optical power of the positive surface is increased too much, spherical aberration on the longer focal length side tilts toward the under side, so that it is also impossible to sufficiently correct aberration with the other surfaces.

In the case where an aspherical surface is provided on a negative surface, when the aspherical surface is provided in a direction such that the limits of the condition are exceeded to decrease the optical power of the negative surface, spherical aberration on the longer focal length side tilts toward the under side too much, and when the aspherical surface is provided in a direction such that the optical power of the negative surface is increased, it is impossible to sufficiently correct negative distortion on the shorter focal length side.

An aspherical surface provided in the second lens unit balances spherical aberration on the shorter focal length side and spherical aberration on the longest focal length condition. When the limits of the condition are exceeded so that the aspherical surface is provided in a direction that decreases the positive optical power, spherical aberration on the longer focal length side tilts toward the over side too much. On the contrary, when the aspherical surface is provided in a direction that increases the positive optical power, spherical aberration on the longer focal length side tilts toward the under side too much. In either case, aberrations, including spherical aberration on the shorter focal length, cannot be sufficiently corrected with the other surfaces, so that the performance degrades.

An aspherical surface provided in the third lens unit is effective mainly in correction of coma on the shorter focal length side, correction of the image plane quality on the longer focal length side and distortion. Therefore, when the aspherical surface is provided in a direction such that the limits of the condition are exceeded to decrease the optical power of the negative surface, negative coma is largely generated on the upper side of the off-axial luminous flux on the shorter focal length side, and aberration correction is impossible at the other image heights Y. On the contrary, when the aspherical surface is provided in a direction that increases the optical power of the negative surface, the image plane on the longer focal length side shifts toward the over side and positive distortion is excessively generated, so that it is impossible to correct aberration with the other surfaces.

The effects of the aspherical surface are also obtained when the aspherical surface is provided on a positive surface. The direction that decreases negative optical power and the direction that increases positive optical power mean the same.

Subsequently, concrete examples of the embodiments of the present invention will be shown with reference to construction data and graphic representations of aberrations. First to fourth examples shown below correspond to the above-described first to the fourth embodiments, respectively, and the lens constructions in FIGS. 1 to 4 show the lens constructions of the corresponding first to fourth examples.

In the examples, ri (i=1,2,3, . . . ) represents the radius of curvature of the i-th surface counted from the object side, di (i=1,2,3, . . . ) represents the i-th axial distance counted from the object side, Ni (i=1,2,3, . . . ) and vi (i=1,2,3, . . . ) represent the refractive index and the Abbe number to the d-line of the i-th lens element counted from the object side, f represents the overall focal length of the lens system, and FNO represents the f-number. In the examples, the overall focal lengths f, the f-numbers FNO and the air distances (axial distances) between the lens units correspond, from the left, to the values at the shortest focal length condition (wide angle condition) (W), at the middle focal length condition (M) and at the longest focal length condition (telephoto condition) (T).

Further, in the examples, the surfaces marked with asterisks at the radius of curvature ri are aspherical surfaces. These surfaces are defined by the following expression representing the surface configuration of an aspherical surface:

$$X(H) = \frac{C \cdot H^2}{1 + \sqrt{1 - \varepsilon \cdot C^2 \cdot H^2}} + \sum_{i \geq 2} A_i \cdot H^i \tag{AS}$$

where

H represents a height in the direction perpendicular to the optical axis,

X(H) represents the amount of axial displacement at the height H (with the vertex as the reference), C represents a paraxial curvature, ε represents quadric surface parameter, and Ai: ith aspherical surface coefficient.

TABLE 1

Embodiment 1
f = 4.1 ~ 12.6 ~ 39.0
FNO = 1.50 ~ 2.00 ~ 4.50

| Radius of Curvature | Axial Distance | Refractive Index | Abbe Number |
|---|---|---|---|
| r1* = 19.084 | | | |
| | d1 = 1.000 | N1 = 1.74957 | ν1 = 51.74 |
| r2 = 12.301 | | | |
| | d2 = 0.010 | | |
| r3 = 12.099 | | | |
| | d3 = 0.632 | N2 = 1.85000 | ν2 = 40.04 |
| r4 = 9.647 | | | |
| | d4 = 6.635 | | |
| r5 = −62.980 | | | |
| | d5 = 0.600 | N3 = 1.48749 | ν3 = 70.44 |
| r6* = 13.723 | | | |
| | d6 = 0.332 | | |
| r7 = 19.737 | | | |
| | d7 = 2.000 | N4 = 1.78850 | ν4 = 22.60 |
| r8 = 66.966 | | | |
| | d8 = 36.270~ | 9.668~ | 0.500 |
| r9 = ∞ | | | |
| | d9 = 0.000 | | |
| r10* = 16.018 | | | |
| | d10 = 1.937 | N5 = 1.71751 | ν5 = 52.90 |
| r11 = −60.272 | | | |
| | d11 = 0.100 | | |
| r12 = 9.743 | | | |
| | d12 = 2.482 | N6 = 1.75450 | ν6 = 51.57 |
| r13 = 191.786 | | | |
| | d13 = 0.100 | | |
| r14 = 71.489 | | | |
| | d14 = 1.383 | N7 = 1.83741 | ν7 = 25.48 |
| r15 = 6.912 | | | |
| | d15 = 1.711 | | |
| r16 = 61.956 | | | |
| | d16 = 0.692 | N8 = 1.82329 | ν8 = 42.47 |
| r17 = −598.634 | | | |
| | d17 = 0.082 | | |
| r18 = ∞ | | | |
| | d18 = 1.584~ | 13.825~ | 40.370 |
| r19* = −8.823 | | | |
| | d19 = 0.600 | N9 = 1.59304 | ν9 = 35.81 |
| r20 = 16.377 | | | |
| | d20 = 0.100 | | |
| r21 = 13.860 | | | |
| | d21 = 0.634 | N10 = 1.79850 | ν10 = 22.60 |
| r22 = 15.197 | | | |
| | d22 = 0.098 | | |
| r23 = 15.491 | | | |
| | d23 = 3.101 | N11 = 1.75450 | ν11 = 51.57 |
| r24* = −6.688 | | | |
| | d24 = 3.516~ | 2.553~ | 0.500 |
| r25 = ∞ | | | |
| | d25 = 3.400 | N13 = 1.51680 | ν12 = 64.20 |
| r26 = ∞ | | | |

Aspherical Coefficient of r1

$\epsilon = 1.0000$
$A4 = -0.41906 \times 10^{-4}$
$A6 = 0.31940 \times 10^{-6}$
$A8 = 0.10803 \times 10^{-9}$
$A10 = -0.14076 \times 10^{-10}$
$A12 = 0.60568 \times 10^{-13}$ Aspherical Coefficient of r6

$\epsilon = 1.0000$
$A4 = -0.19148 \times 10^{-3}$
$A6 = 0.84012 \times 10^{-6}$
$A8 = 0.10803 \times 10^{-9}$
$A10 = -0.14076 \times 10^{-10}$
$A12 = 0.60568 \times 10^{-13}$

TABLE 1-continued

Embodiment 1
f = 4.1 ~ 12.6 ~ 39.0
FNO = 1.50 ~ 2.00 ~ 4.50

Aspherical Coefficient of r6

$\epsilon = 1.0000$
$A4 = -0.19148 \times 10^{-3}$
$A6 = 0.84012 \times 10^{-6}$
$A8 = -0.76785 \times 10^{-8}$ Aspherical Coefficient of r10

$\epsilon = 1.0000$
$A4 = -0.63250 \times 10^{-4}$
$A6 = -0.62077 \times 10^{-7}$
$A8 = 0.68251 \times 10^{-9}$
$A10 = -0.32807 \times 10^{-10}$
$A12 = -0.10530 \times 10^{-12}$ Aspherical Coefficient of r19

$\epsilon\ 1.000$
$A4 = -0.67047 \times 10^{-3}$
$A6 = -0.31691 \times 10^{-4}$
$A8 = 0.24135 \times 10^{-5}$
$A10 = -0.44738 \times 10^{-7}$
$A12 = 0.60940 \times 10^{-9}$ Aspherical Coefficient of r24

$\epsilon = 1.0000$
$A4 = 0.50458 \times 10^{-3}$
$A6 = -0.76708 \times 10^{-6}$
$A8 = 0.37831 \times 10^{-6}$

TABLE 2

Embodiment 2
f = 4.1 ~ 12.6 ~ 39.0
FNO = 1.50 ~ 2.00 ~ 4.50

| Radius of Curvature | Axial Distance | Refractive Index | Abbe Number |
|---|---|---|---|
| r1* = 19.540 | | | |
| | d1 = 1.000 | N1 = 1.84705 | ν1 = 25.00 |
| r2 = 17.149 | | | |
| | d2 = 0.100 | | |
| r3 = 17.157 | | | |
| | d3 = 0.600 | N2 = 1.68195 | ν2 = 32.64 |
| r4 = 9.732 | | | |
| | d4 = 6.776 | | |
| r5* = −115.208 | | | |
| | d5 = 0.600 | N3 = 1.48993 | ν3 = 70.08 |
| r6* = 24.661 | | | |
| | d6 = 0.038 | | |
| r7 = 25.372 | | | |
| | d7 = 2.825 | N4 = 1.79850 | ν4 = 22.60 |
| r8 = −51.977 | | | |
| | d8 = 0.800 | N5 = 1.75450 | ν5 = 51.57 |
| r9* = 28.425 | | | |
| | d9 = 35.406~ | 9.625~ | 1.000 |
| r10 = ∞ | | | |
| | d10 = 0.000 | | |
| r11* = 14.951 | | | |
| | d11 = 1.948 | N6 = 1.75450 | ν6 = 51.57 |
| r12 = −78.641 | | | |
| | d12 = 0.100 | | |
| r13 = 9.719 | | | |
| | d13 = 2.464 | N7 = 1.75450 | ν7 = 51.57 |
| r14 = 211.455 | | | |
| | d14 = 0.100 | | |
| r15 = 65.249 | | | |
| | d15 = 1.098 | N8 = 1.84198 | ν8 = 25.12 |
| r16 = 6.886 | | | |
| | d16 = 1.434 | | |
| r17 = 23.480 | | | |
| | d17 = 0.766 | N9 = 1.59500 | ν9 = 59.35 |

TABLE 2-continued

Embodiment 2
f = 4.1 ~ 12.6 ~ 39.0
FNO = 1.50 ~ 2.00 ~ 4.50

| | | | |
|---|---|---|---|
| r18* = 59.599 | | | |
| | d18 = 0.297 | | |
| r19 = ∞ | | | |
| | d19 = 1.562~ | 13.132~ | 39.040 |
| r20* = −8.196 | | | |
| | d20 = 0.600 | N10 = 1.60239 | ν10 = 34.59 |
| r21 = 14.305 | | | |
| | d21 = 0.100 | | |
| r22 = 12.891 | | | |
| | d22 = 0.676 | N11 = 1.79850 | ν11 = 22.60 |
| r23 = 16.509 | | | |
| | d23 = 0.103 | | |
| r24 = 16.873 | | | |
| | d24 = 2.834 | N12 = 1.75450 | ν12 = 51.57 |
| r25* = −6.618 | | | |
| | d25 = 3.572~ | 2.687~ | 0.500 |
| r26 = ∞ | | | |
| | d26 = 3.400 | N13 = 1.51680 | ν13 = 64.20 |
| r27 = ∞ | | | |

Aspherical Coefficient of r1

ε = 1.0000
A4 = −0.39384 × 10⁻⁴
A6 = 0.52957 × 10⁻⁶
A8 = −0.32631 × 10⁻⁸
A10 = 0.14465 × 10⁻¹⁰
A12 = −0.25998 × 10⁻¹³
Aspherical Coefficient of r5

ε = 1.0000
A4 = −0.17338 × 10⁻⁴
A6 = −0.13443 × 10⁻⁶
A8 = −0.60930 × 10⁻⁸
A10 = 0.26340 × 10⁻⁹
A12 = −0.17886 × 10⁻¹¹
Aspherical Coefficient of r6

ε = 1.0000
A4 = −0.16790 × 10⁻³
A6 = 0.13513 × 10⁻⁵
A8 = 0.76036 × 10⁻⁸
Aspherical Coefficient of r9

ε = 1.0000
A4 = 0.79814 × 10⁻⁶
A6 = −0.64134 × 10⁻⁶
A8 = −0.40076 × 10⁻⁸
A10 = 0.35000 × 10⁻¹⁰
A12 = −0.49658 × 10⁻¹²
Aspherical Coefficient of r11

ε = 1.0000
A4 = −0.60852 × 10⁻⁴
A6 = −0.26264 × 10⁻⁶
A8 = 0.21554 × 10⁻⁸
A10 = 0.39938 × 10⁻¹⁰
A12 = −0.13491 × 10⁻¹¹
Aspherical Coefficient of r18

ε = 1.0000
A4 = 0.27451 × 10⁻⁴
A6 = 0.39292 × 10⁻⁶
A8 = −0.15431 × 10⁻⁸
A10 = 0.22310 × 10⁻⁹
A12 = −0.14701 × 10⁻¹⁰
Aspherical Coefficient of r20

ε = 1.0000
A4 = −0.52593 × 10⁻³
A6 = −0.30643 × 10⁻⁴
A8 = 0.32031 × 10⁻⁵
A10 = −0.88175 × 10⁻⁷
A12 = 0.17534 × 10⁻⁸

TABLE 2-continued

Embodiment 2
f = 4.1 ~ 12.6 ~ 39.0
FNO = 1.50 ~ 2.00 ~ 4.50

Aspherical Coefficient of r25

ε = 1.0000
A4 = 0.56650 × 10⁻³
A6 = −0.54957 × 10⁻⁶
A8 = −0.42840 × 10⁻⁶

TABLE 3

Embodiment 3
f = 3.5 ~ 11.1 ~ 33.7
FNO = 2.00 ~ 2.00 ~ 4.50

| Radius of Curvature | Axial Distance | Refractive Index | Abbe Number |
|---|---|---|---|
| r1 = 17,007 | | | |
| | d1 = 1.000 | N1 = 1.61301 | ν1 = 33.33 |
| r2 = 11.136 | | | |
| | d2 = 2.904 | | |
| r3* = 13.744 | | | |
| | d3 = 3.067 | N2 = 1.48749 | ν2 = 70.44 |
| r4 = 15.446 | | | |
| | d4 = 1.824 | | |
| r5* = 37.371 | | | |
| | d5 = 0.600 | N3 = 1.48749 | ν3 = 70.44 |
| r6 = 9.203 | | | |
| | d6 = 7.160 | | |
| r7 = −18.191 | | | |
| | d7 = 0.600 | N4 = 1.57027 | ν4 = 61.25 |
| r8 = 20.332 | | | |
| | d8 = 2.176 | N5 = 1.79850 | ν5 = 22.60 |
| r9 = 1033.645 | | | |
| | d9 = 22.974~ | 5.237~ | 0.100 |
| r10 = ∞ | | | |
| | d10 = 22.744~ | 4.733~ | 0.100 |
| r11 = 10.974 | | | |
| | d11 = 0.829 | N6 = 1.84999 | ν6 = 39.97 |
| r12 = 8.594 | | | |
| | d12 = 3.592 | N7 = 1.65700 | ν7 = 53.36 |
| r13 = −439.379 | | | |
| | d13 = 0.100 | | |
| r14 = 9.290 | | | |
| | d14 = 2.158 | N8 = 1.48749 | ν8 = 70.44 |
| r15 = 32.532 | | | |
| | d15 = 0.617 | | |
| r16 = ∞ | | | |
| | d16 = 0.258~ | 0.268~ | 0.507 |
| r17 = 28.322 | | | |
| | d17 = 1.862 | N9 = 1.48749 | ν9 = 70.44 |
| r18 = −15.234 | | | |
| | d18 = 0.600 | N10 = 1.84835 | ν10 = 30.00 |
| r19 = 27.024 | | | |
| | d19 = 0.848 | | |
| r20 = −32.206 | | | |
| | d20 = 0.600 | N11 = 1.84807 | ν11 = 28.73 |
| r21 = 13.145 | | | |
| | d21 = 2.593~ | 0.634~ | 0.100 |
| r22* = 8.394 | | | |
| | d22 = 2.294 | N12 = 1.48749 | ν12 = 70.44 |
| r23 = −15.929 | | | |
| | d23 = 1.775 | | |
| r24 = 110.020 | | | |
| | d24 = 1.144 | N13 = 1.79850 | ν13 = 22.60 |
| r25 = −16.695 | | | |
| | d25 = 0.529 | | |
| r26 = −9.624 | | | |
| | d26 = 0.600 | n14 = 1.83033 | ν14 = 41.79 |
| r27 = −22.291 | | | |
| | d27 = 0.500~ | 9.505~ | 34.064 |

TABLE 3-continued

Embodiment 3
f = 3.5 ~ 11.1 ~ 33.7
FNO = 2.00 ~ 2.00 ~ 4.50

| Radius of Curvature | Axial Distance | Refractive Index | Abbe Number |
|---|---|---|---|
| r27 ∞ | | | |
| | d28 3.700 | N15 = 1.51680 | ν15 = 64.20 |
| r28 ∞ | | | |

Aspherical Coefficient of r3

$\epsilon = 1.0000$
$A4 = 0.27737 \times 10^{-4}$
$A6 = -0.24383 \times 10^{-6}$
$A8 = 0.52704 \times 10^{-7}$
$A10 = -0.50059 \times 10^{-9}$
$A12 = 0.21932 \times 10^{-11}$ Aspherical Coefficient of r5

$\epsilon = 1.0000$
$A4 = 0.37116 \times 10^{-4}$
$A6 = 0.32627 \times 10^{-5}$
$A8 = -0.51795 \times 10^{-7}$
$A10 = 0.23272 \times 10^{-9}$ Aspherical Coefficient of r22

$\epsilon = 1.0000$
$A4 = -0.67683 \times 10^{-3}$
$A6 = 0.15976 \times 10^{-5}$
$A8 = 0.29551 \times 10^{-8}$
$A10 = -0.19611 \times 10^{-8}$

TABLE 4

Embodiment 4
f = 4.1 ~ 11.0 ~ 27.5
FNO = 2.87 ~ 2.87 ~ 2.87

| Radius of Curvature | Axial Distance | Refractive Index | Abbe Number |
|---|---|---|---|
| r1 = 14.797 | | | |
| | d1 = 0.600 | N1 = 1.78268 | ν1 = 23.10 |
| r2 = 9.566 | | | |
| | d2 = 3.472 | | |
| r3* = 16.781 | | | |
| | d3 = 3.470 | N2 = 1.85000 | ν2 = 40.04 |
| r4 = 308.950 | | | |
| | d4 = 0.397 | | |
| r5* = −45.223 | | | |
| | d5 = 0.600 | N3 = 1.48749 | ν3 = 70.44 |
| r6 = 6.978 | | | |
| | d6 = 5.056 | | |
| r7 = −9.845 | | | |
| | d7 = 0.600 | N4 = 1.48749 | ν4 = 70.44 |
| r8 = 23.450 | | | |
| | d8 = 1.133 | N5 = 1.79850 | ν5 = 22.60 |
| r9 = −139.104 | | | |
| | d9 = 13.751~ | 3.630~ | 0.100 |
| r10 = ∞ | | | |
| | d10 = 14.112~ | 3.221~ | 0.100 |
| r11 = 10.581 | | | |
| | d11 = 1.000 | N6 = 1.84875 | ν6 = 31.91 |
| r12 = 8.286 | | | |
| | d12 = 2.625 | N7 = 1.67616 | ν7 = 54.67 |
| r13 = −104.241 | | | |
| | d13 = 0.135 | | |
| r14 = 9.322 | | | |
| | d14 = 1.786 | N8 = 1.48749 | ν8 = 70.44 |
| r15 = 59.599 | | | |
| | d15 = 0.150 | | |
| r16 = ∞ | | | |
| | d16 = 1.145~ | 1.202~ | 1.539 |
| r17 = 202.555 | | | |
| | d17 = 1.268 | N9 = 1.48943 | ν9 = 70.15 |

TABLE 4-continued

Embodiment 4
f = 4.1 ~ 11.0 ~ 27.5
FNO = 2.87 ~ 2.87 ~ 2.87

| Radius of Curvature | Axial Distance | Refractive Index | Abbe Number |
|---|---|---|---|
| r18 = −13.102 | | | |
| | d18 = 0.600 | N10 = 1.84840 | ν10 = 30.12 |
| r19 = 70.775 | | | |
| | d19 = 0.685 | | |
| r20 = −18.690 | | | |
| | d20 = 0.600 | N11 = 1.84852 | ν11 = 30.75 |
| r21 = 18.364 | | | |
| | d21 = 1.900~ | 0.600~ | 0.100 |
| r22* = 9.940 | | | |
| | d22 = 2.022 | N12 = 1.48749 | ν12 = 70.44 |
| r23 = −12.666 | | | |
| | d23 = 2.200 | | |
| r24 = 86.800 | | | |
| | d24 = 1.132 | N13 = 1.74100 | ν13 = 24.64 |
| r25 = −17.065 | | | |
| | d25 = 0.633 | | |
| r26 = −8.788 | | | |
| | d26 = 0.600 | N14 = 1.84888 | ν14 = 32.59 |
| r27 = −14.767 | | | |
| | d27 = 0.500~ | 8.876~ | 27.194 |
| r28 ∞ | | | |
| | d28 3.700 | N15 = 1.51680 | ν15 = 64.20 |
| r29 ∞ | | | |

Aspherical Coefficient of r3

$\epsilon = 1.0000$
$A4 = 0.48009 \times 10^{-4}$
$A6 = -0.74440 \times 10^{-6}$
$A8 = 0.15143 \times 10^{-7}$
$A10 = -0.17749 \times 10^{-9}$
$A12 = 0.17420 \times 10^{-11}$ Aspherical Coefficient of r5

$\epsilon = 1.0000$
$A4 = 0.11623 \times 10^{-3}$
$A6 = 0.28904 \times 10^{-5}$
$A8 = -0.64560 \times 10^{-7}$
$A10 = 0.35226 \times 10^{-9}$ Aspherical Coefficient of r22

$\epsilon = 1.0000$
$A4 = -0.72620 \times 10^{-3}$
$A6 = 0.49589 \times 10^{-5}$
$A8 = -0.27755 \times 10^{-7}$
$A10 = -0.25643 \times 10^{-8}$ FIGS. 5 to 9 are graphic representations of aberrations corresponding to the first to the fourth examples. These representations show, from the left, spherical aberration, astigmatism and distortion, and show, from the top, aberrations of the optical system at the shortest focal length condition (wide-angle condition), at the middle focal length condition and at the longest focal length condition (telephoto condition).

In the representations of spherical aberration, the solid line d represents the amount of aspherical aberration to the d-line, SC represents the unsatisfied amount of sine condition. In the representations of astigmatism, the solid line DS represents the sagittal image plane and the dotted line DM represents the meridional image plane. The longitudinal axes of the representations of spherical aberration represent the F numbers of the light ray. The longitudinal axes of the representations of astigmatism and distortion represent the maximum image heights Y'.

The values of the examples corresponding to the conditions are shown in Tables 5 to 9. In the data, the letter E following the numbers represents the exponent; for example, 1.0E-2 represents $1.0 \times 10^{-2}$.

TABLE 5

|  | Embodiment 1 | Embodiment 2 | Embodiment 3 | Embodiment 4 |
|---|---|---|---|---|
| Condition (1) | 9.51040 | 9.51217 | 9.60322 | 6.74591 |
| Condition (2) | 17.0729 | 17.0732 | 25.8929 | 16.5156 |
| Condition (3) | 4.5341 | 4.28181 | 3.48620 | 2.56108 |
| Condition (4) | 3.77460 | 3.58233 | 3.14348 | 2.34295 |
| Condition (5) | 14.57 | 14.8459 | 13.3393 | 13.3455 |

TABLE 6

Condition (6) Values of Embodiment 1

|  | r1 | r6 | r10 | r19 | r24 |
|---|---|---|---|---|---|
| 0.1Hmax | −0.7017E-05 | −0.8949E-05 | −0.1817E-05 | 0.5467E-05 | −0.1783E-04 |
| 0.2Hmax | −0.5364E-04 | −0.7055E-04 | −0.1456E-04 | 0.4491E-04 | −0.1426E-03 |
| 0.3Hmax | −0.1671E-03 | −0.2327E-03 | −0.4926E-04 | 0.1574E-03 | −0.4822E-03 |
| 0.4Hmax | −0.3512E-03 | −0.5359E-03 | −0.1172E-03 | 0.3890E-03 | −0.1154E-02 |
| 0.5Hmax | −0.5809E-03 | −0.1015E-02 | −0.2299E-03 | 0.7883E-03 | −0.2303E-02 |
| 0.6Hmax | −0.8087E-03 | −0.1708E-02 | −0.3997E-03 | 0.1395E-02 | −0.4148E-02 |
| 0.7Hmax | −0.9861E-03 | −0.2671E-02 | −0.6402E-03 | 0.2222E-02 | −0.7041E-02 |
| 0.8Hmax | −0.1080E-02 | −0.4009E-02 | −0.9682E-03 | 0.3229E-02 | −0.1157E-01 |
| 0.9Hmax | −0.1014E-02 | −0.5915E-02 | −0.1407E-02 | 0.4292E-02 | −0.1871E-01 |
| 1.0Hmax | −0.3683E-03 | −0.8724E-02 | −0.1996E-02 | 0.5163E-02 | −0.2999E-01 |

TABLE 7

Condition (6) Values of Embodiment 2

|  | r1 | r5 | r6 | r9 | r11 | r18 | r20 | r25 |
|---|---|---|---|---|---|---|---|---|
| 0.1Hmax | −0.1006E-04 | 0.1074E-06 | −0.4335E-05 | 0.4900E-08 | −0.2137E-05 | 0.6497E-07 | 0.5343E-05 | −0.2141E-04 |
| 0.2Hmax | −0.7354E-04 | 0.8887E-06 | −0.3368E-04 | −0.8028E-06 | −0.1722E-04 | 0.5269E-06 | 0.4421E-04 | −0.1713E-03 |
| 0.3Hmax | −0.2126E-03 | 0.3186E-05 | −0.1078E-03 | −0.7646E-05 | −0.5878E-04 | 0.1818E-05 | 0.1561E-03 | −0.5801E-03 |
| 0.4Hmax | −0.4013E-03 | 0.8144E-05 | −0.2348E-03 | −0.3542E-04 | −0.1414E-03 | 0.4442E-05 | 0.3862E-03 | −0.1391E-02 |
| 0.5Hmax | −0.5690E-03 | 0.1677E-04 | −0.4025E-03 | −0.1155E-03 | −0.2808E-03 | 0.9023E-05 | 0.7755E-03 | −0.2787E-02 |
| 0.6Hmax | −0.6144E-03 | 0.2795E-04 | −0.5659E-03 | −0.3049E-03 | −0.4940E-03 | 0.1640E-04 | 0.1340E-02 | −0.5046E-02 |
| 0.7Hmax | −0.4091E-03 | 0.3477E-04 | −0.6304E-03 | −0.7024E-03 | −0.7990E-03 | 0.2786E-04 | 0.2038E-02 | −0.8627E-02 |
| 0.8Hmax | 0.2267E-03 | 0.2281E-04 | −0.4291E-03 | −0.1481E-02 | −0.1216E-02 | 0.4577E-04 | 0.2736E-02 | −0.1430E-01 |
| 0.9Hmax | 0.1565E-02 | −0.1700E-04 | 0.3070E-03 | −0.2962E-02 | −0.1775E-02 | 0.7498E-04 | 0.3140E-02 | −0.2334E-01 |
| 1.0Hmax | 0.3933E-02 | −0.3063E-04 | 0.1987E-02 | −0.5789E-02 | −0.2534E-02 | 0.1259E-03 | 0.2694E-02 | −0.3773E-01 |

TABLE 8

Condition (6) Values of Embodiment 3

|  | r3 | r5 | r24 |
|---|---|---|---|
| 0.1Hmax | 0.2161E-05 | 0.1266E-05 | −0.7716E-05 |
| 0.2Hmax | 0.9108E-05 | 0.1358E-04 | −0.6158E-04 |
| 0.3Hmax | −0.2793E-05 | 0.6146E-04 | −0.2070E-03 |
| 0.4Hmax | −0.6912E-04 | 0.1808E-03 | −0.4882E-03 |
| 0.5Hmax | −0.1794E-03 | 0.3938E-03 | −0.9476E-03 |
| 0.6Hmax | −0.2251E-03 | 0.6724E-03 | −0.1627E-02 |
| 0.7Hmax | 0.6057E-04 | 0.9245E-03 | −0.2569E-02 |
| 0.8Hmax | 0.1515E-02 | 0.1076E-02 | −0.3829E-02 |
| 0.9Hmax | 0.7445E-02 | 0.1363E-02 | −0.5484E-02 |
| 1.0Hmax | 0.2969E-01 | 0.2997E-02 | −0.7666E-02 |

TABLE 9

Condition (6) Values of Embodiment 4

|  | r3 | r5 | r22 |
|---|---|---|---|
| 0.1Hmax | 0.5975E-05 | −0.1593E-05 | −0.5516E-05 |
| 0.2Hmax | 0.4532E-04 | −0.1366E-04 | −0.4388E-04 |
| 0.3Hmax | 0.1414E-03 | −0.5032E-04 | −0.1467E-03 |
| 0.4Hmax | 0.3065E-03 | −0.1289E-03 | −0.3433E-03 |
| 0.5Hmax | 0.5544E-03 | −0.2633E-03 | −0.6598E-03 |

TABLE 9-continued

Condition (6) Values of Embodiment 4

|  | r3 | r5 | r22 |
|---|---|---|---|
| 0.6Hmax | 0.9309E-03 | −0.4521E-03 | −0.1119E-02 |
| 0.7Hmax | 0.1599E-02 | −0.6674E-03 | −0.1744E-02 |
| 0.8Hmax | 0.3111E-02 | −0.8588E-03 | −0.2558E-02 |
| 0.9Hmax | 0.7211E-02 | −0.9928E-03 | −0.3599E-02 |
| 1.0Hmax | 0.1887E-01 | −0.1160E-02 | −0.4933E-02 |

As described above in detail, according to the present invention, a zoom lens system can be provided that is compact although having high magnification and high image quality.

Therefore, application of the zoom lens system of the present invention to a taking optical system for digital cameras contributes to performance improvement and size reduction of the camera.

Although the present invention has been fully described by way of examples with reference to the accompanying drawings, it is to be noted that various changes and modification will be apparent to those skilled in the art. Therefore, unless such changes and modifications depart from the scope of the present invention, they should be construed as being included therein.

What is claimed is:

1. A zoom lens system comprising, from an object side to an image side:

a first lens unit having a negative optical power and provided at a most object side of the zoom lens system;

a second lens unit having a positive optical power; and a third lens unit, wherein distances between the lens units are varied by moving all of the lens units during zooming, and the following condition is satisfied:

$$5.0 < \frac{fT}{fW} < 12.0$$

where fT is an overall focal length of the zoom lens system at the longest focal length condition, and fW is an overall focal length of the zoom lens system at the shortest focal length condition.

2. A zoom lens system as claimed in claim 1, wherein the following condition is satisfied:

$$14.0 < \frac{TW}{fW}$$

TW is an overall length of the zoom lens system at the shortest focal length condition.

3. A zoom lens system as claimed in claim 1, wherein the following condition is satisfied:

$$2.0 < \frac{|f1|}{fW} < 5.0$$

where f1 represents a focal length of the first lens unit.

4. A zoom lens system as claimed in claim 1, wherein the following condition is satisfied:

$$2.0 < \frac{f2}{fW} < 4.5$$

where f2 represents a focal length of the second lens unit.

5. A zoom lens system as claimed in claim 1, wherein the following condition is satisfied:

$$11 < img * R < 17$$

where img is a maximum image height, and

R is a effective aperture of a most image side surface.

6. A zoom lens system as claimed in claim 1, wherein the zoom lens system includes at least one aspherical surface and the at least one aspherical surface satisfies the following condition:

$$-0.1 < \phi \cdot (N' - N) \cdot \frac{d}{dH} \{X(H) - X0(H)\} < 0$$

where d/dH represents a differential symbol,

φ represents an optical power of the at least one aspherical surface,

N' represents a refractive index of a medium on the image side of the at least one aspherical surface, N represents a refractive index of a medium on the object side of the at least one aspherical surface, H represents a height in a direction vertical to an optical axis, X(H) represents an amount of axial displacement at the height H (with a vertex as a reference), and X0(H) is an amount of displacement of a reference spherical surface at the height H (with the vertex as the reference).

7. A zoom lens system as claimed in claim 6, wherein the at least one aspherical surface is provided at the first lens unit.

8. A zoom lens system as claimed in claim 6, wherein the at least one aspherical surface is provided at the second lens unit.

9. A zoom lens system as claimed in claim 6, wherein the at least one aspherical surface is provided at the third lens unit.

10. A zoom lens system as claimed in claim 1, wherein the first lens unit is adapted to be moved toward the image side and then moved toward the object side during the zooming from the shortest focal length condition to the longest focal length condition.

11. A zoom lens system unit as claimed in claim 1, wherein the zoom lens system consists of three lens units.

12. A zoom lens system unit as claimed in claim 1, wherein the zoom lens system consists of four lens units.

13. A zoom lens system unit as claimed in claim 1, further comprising a diaphragm, provided between the first lens unit and the second lens units.

14. A zoom lens system unit as claimed in claim 13, wherein the diaphragm is fixed.

15. A zoom lens system unit as claimed in claim 13, wherein the diaphragm is movable during zooming.

16. A zoom lens system for forming an image of an object on a solid state imaging device, comprising, from an object side to an image side:

a first lens unit having a negative optical power and provided at the most object side of the zoom lens system;

a second lens unit having a positive optical power;

a third lens unit; and a filter, provided at the object side of the solid state imaging device, wherein distances between the lens units are varied by moving all of the lens units during zooming, and the following condition is satisfied:

$$5.0 < \frac{fT}{fW} < 12.0$$

where $f_T$ is an overall focal length of the zoom lens system at a longest focal length condition, and $f_W$ is an overall focal length of the zoom lens system at a shortest focal length condition.

17. A zoom lens system as claimed in claim 16, wherein the first lens unit is adapted to be moved toward the image side and then moved toward the object side during zooming from the shortest focal length condition to the longest focal length condition.

18. A zoom lens system as claimed in claim 16, wherein the zoom lens system consists of three lens units.

19. A zoom lens system as claimed in claim 16, wherein the zoom lens system consists of four lens units.

20. A zoom lens system as claimed in claim 16, further comprising a diaphragm, provided between the first lens unit and the second lens unit.

21. A zoom lens system as claimed in claim 20, wherein the diaphragm is fixed.

22. A zoom lens system as claimed in claim 20, wherein the diaphragm is movable during zooming.

23. A zoom lens system as claimed in claim 16, wherein the filter is fixed during zooming.

24. A zoom lens unit as claimed in claim 16, wherein the filter is movable during zooming.

* * * * *

UNITED STATES PATENT AND TRADEMARK OFFICE
CERTIFICATE OF CORRECTION

PATENT NO.   : 6,038,084
DATED        : March 14, 2000
INVENTOR(S)  : Takashi Okada et al.

It is certified that error appears in the above-identified patent and that said Letters Patent is hereby corrected as shown below:

On the front page [75] Inventors:, the first line, after "Okada,", delete "Nishinomiya", and insert —Nishinomiya-Shi—.

On the front page [75] Inventors:, the second line, after "Arimoto,", delete "Sakai", and insert —Sakai-Shi—.

On the front page [75] Inventors:, the second and third lines, after "Terada,", delete "Sakai", and insert —Sakai-Shi—.

On the front page [75] Inventors:, the second and third line, after "Konno,", delete "Sakai", and insert —Sakai-Shi—.

On the front page [75] Inventors;, the fourth line, after "Kohno,", delete "Toyonaka", and insert —Toyonaka-Shi—.

Signed and Sealed this

Fifth Day of June, 2001

Attest:

Attesting Officer

NICHOLAS P. GODICI

*Acting Director of the United States Patent and Trademark Office*